July 24, 1962      E. J. HOUDRY      3,045,422
TEMPERATURE CONTROL OF A CATALYTIC EXHAUST PURIFIER
Original Filed April 1, 1957      3 Sheets-Sheet 1
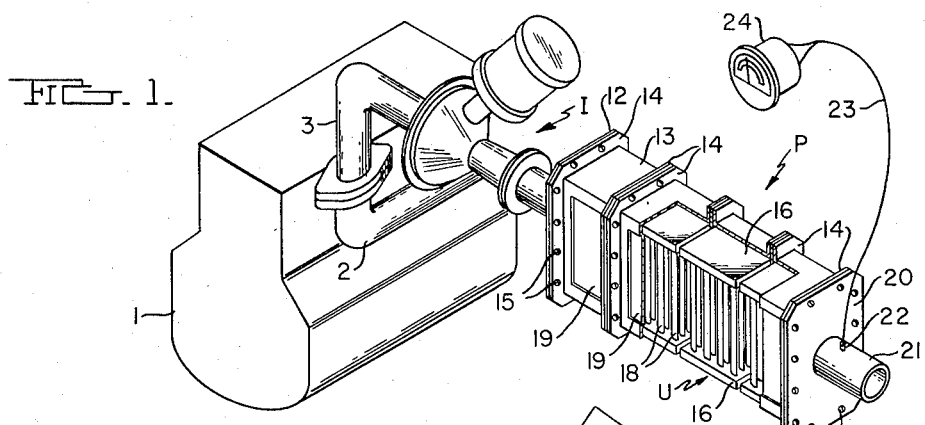
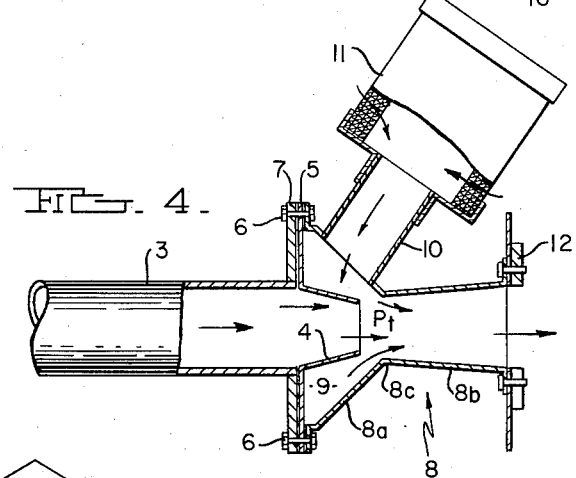
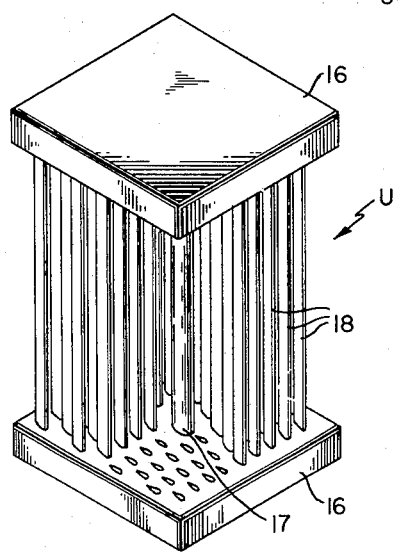
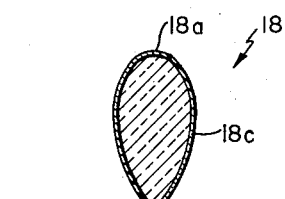
INVENTOR.
EUGENE J. HOUDRY
BY
ATTORNEY

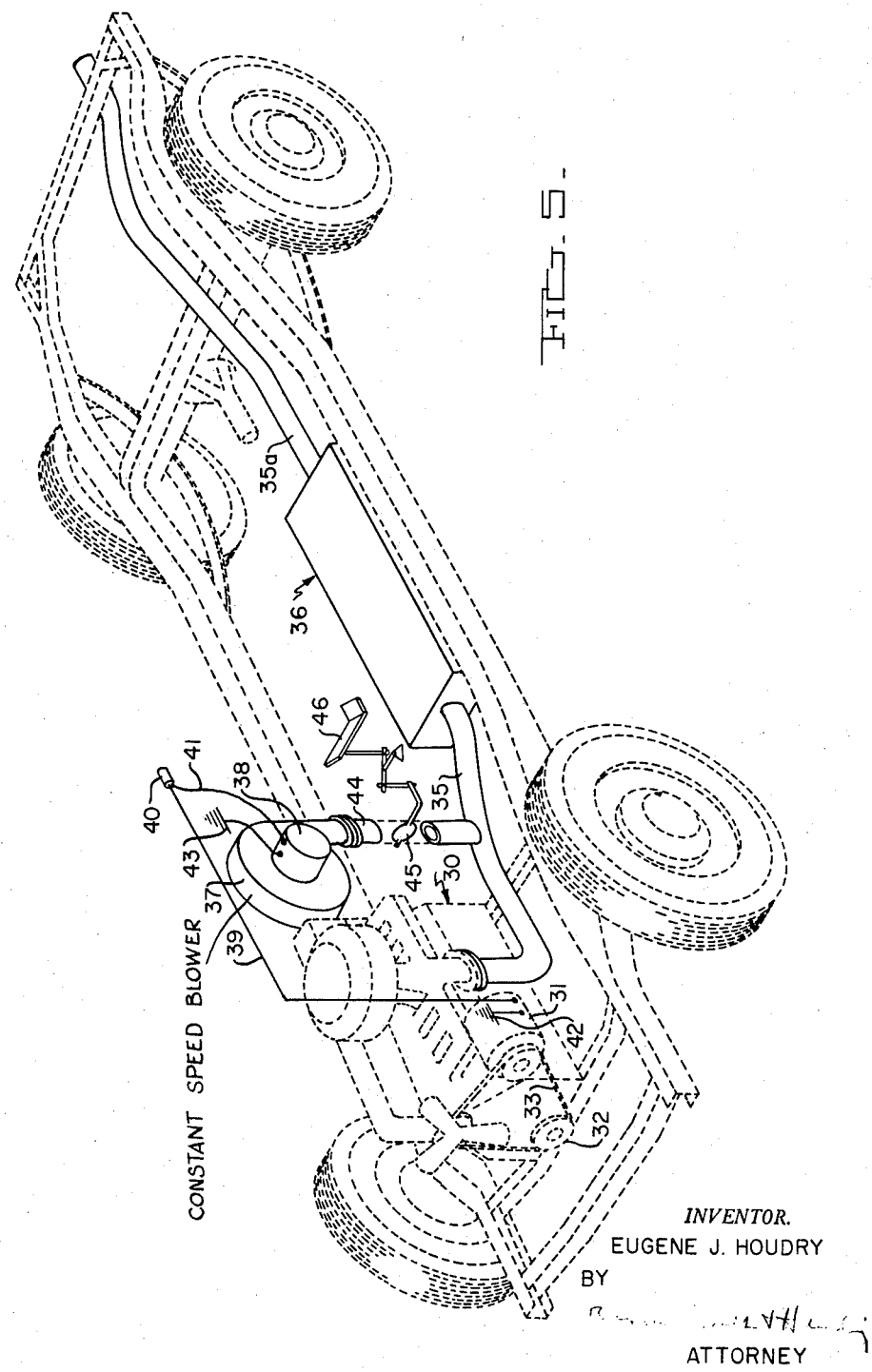

July 24, 1962   E. J. HOUDRY   3,045,422
TEMPERATURE CONTROL OF A CATALYTIC EXHAUST PURIFIER
Original Filed April 1, 1957   3 Sheets-Sheet 3
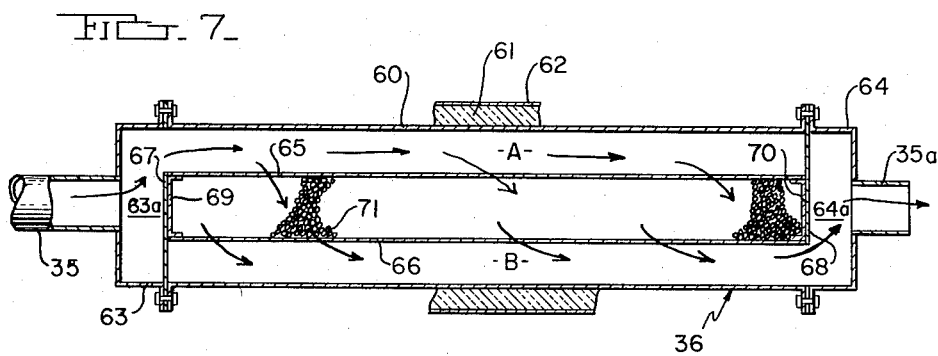
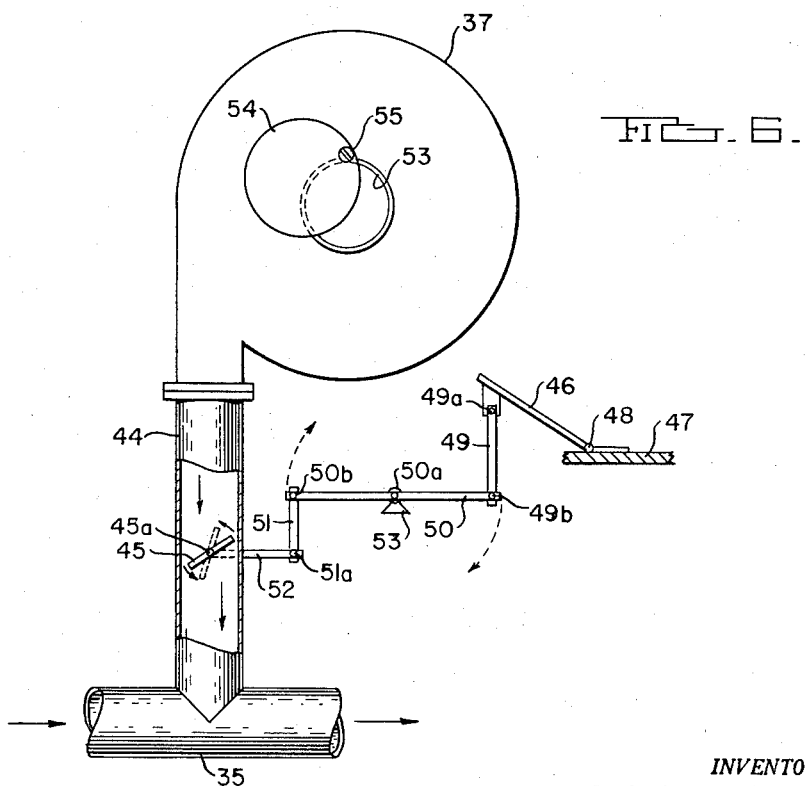
INVENTOR.
EUGENE J. HOUDRY
BY
ATTORNEY

United States Patent Office 3,045,422
Patented July 24, 1962

3,045,422
TEMPERATURE CONTROL OF A CATALYTIC
EXHAUST PURIFIER
Eugene J. Houdry, Ardmore, Pa., assignor to Oxy-Catalyst, Inc., Wayne, Pa., a corporation of Pennsylvania
Continuation of application Ser. No. 649,848, Apr. 1, 1957. This application Sept. 18, 1959, Ser. No. 840,924
4 Claims. (Cl. 60—30)

This invention relates to catalytic purifiers for exhaust fumes from gasoline-powered internal combustion engines.

The catalytic purification of gasoline engine exhaust fumes is well known in principle. However, intensive experimentation in this field over a long period has shown that the difficulties involved in adapting this principle to a practical device are surprisingly great. One of the principal causes for these difficulties is the variable nature of the exhaust gas stream as the engine operates over its full range of speed and load conditions. Wide variations occur in the temperature and flow rate of the exhaust stream as well as in the concentration of oxidizable constituents to be oxidized. The concentration of oxidizable constituents is further dependent upon the average engine adjustment, particularly with respect to fuel-air ratios employed. Depending upon the average conditions under which the engine operates the average fuel-air ratio may vary considerably, thus affecting the average combustibles concentration in the exhaust stream.

It has been found that the successful application of the catalytic principle to exhaust purification depends upon maintaining the catalyst bed within a certain range of relatively high temperatures under all conditions of operation despite the varying temperature, flow rate and concentration of oxidizable material in the exhaust gas stream. The elimination of the oxidizable constituents, particularly hydrocarbons and oxygenated organic compounds, depends directly upon the temperature level at which the catalyst bed is maintained. Likewise, the volume of catalyst required varies with the temperature of operation, larger amounts of catalyst being necessary with lower temperatures of operation. With presently available catalysts operating temperatures within the range of 800° F. to 1400° F. and more desirably between 900° F. and 1200° F. are required for effective purification.

In order to provide a practical catalytic exhaust purifier, it is necessary to maintain the catalyst bed at these temperature levels solely by the sensible and chemical heat present in the exhaust gas stream itself. The use of a combustion chamber supplied with auxiliary fuel greatly increases the complexity and cost of the device as well as introducing a continual operating cost in the form of additional fuel.

In accordance with the invention it has been found that the maintenance of the catalyst temperature within the proper range using only the sensible and chemical heat in the exhaust stream to maintain these temperatures is critically dependent upon the manner in which the air necessary to provide for the oxidation of the combustibles in the exhaust gas is supplied to the system. The necessity for supplying outside air to be mixed with the exhaust gas is of course in itself well known, this necessity arising from the fact that the exhaust gases contain insufficient oxygen under most or all conditions of operation to supply the stoichiometric oxygen requirements for oxidizing the combustible constituents present. It has been found, however, that supply of air merely with a view to providing the necessary oxygen for the combustibles does not result in satisfactory operation. If, for example, the air to exhaust gas ratio is set so as to supply the oxygen required at idling speed, when the concentration of combustibles is at or close to its maximum, and this ratio is maintained through all speeds of the engine, the purifier will operate at very low efficiencies or not at all, despite the fact that sufficient oxygen is supplied at all conditions to satisfy that required for oxidation of the combustibles present. As will be explained in detail, a continuous adjustment of the air to exhaust gas ratios over the range of operating speeds of the engine is essential to maintain the catalyst within an effective range of operating temperatures. Furthermore, if under some conditions of operation the outside air is adjusted merely with respect to the content of combustibles in the stream, excessive catalyst operating temperatures will result greatly reducing the catalyst life and perhaps resulting in serious damage to the purifier housing.

Thus, in addition to the recognized necessity for providing the necessary oxygen requirements, efficient operation of the purifier has been found to be dependent upon control of the air supply so as to provide a continuous variation in the air to exhaust gas ratio as the engine operates over its full range of speeds, plus control with respect to the average concentration of combustible material present, which in some cases may require the use of substantial amounts of excess air over and above stoichiometric requirements or in other cases may require that the amount of air be reduced to an absolute minimum over all conditions.

The continuous variation in the air to exhaust gas ratio as the engine operates over its range of speeds should be such that this ratio is highest at the idling speed of the engine and progressively decreases as the engine speed increases. The necessity for this type of control will become apparent from the following detailed description and examples. In general however, it is based upon the observation that the contribution of heat to the catalyst bed by the exhaust gases at idling is principally in the form of chemical heat (that is heat released by oxidation of the combustibles present) and principally in the form of sensible heat at higher engine speeds. Thus, the relatively high ratio of air to exhaust gases required at idling to furnish the necessary oxygen is not required at higher engine speeds and furthermore, the sensible heat content in the exhaust gases at the higher speeds is not sufficient to maintain the catalyst bed at proper operating temperatures in the presence of any large excess of air.

The necessity for controlling the air supply with respect to the average concentration of combustibles in the exhaust gas arises from the fact that there is a considerable variation in the average combustibles concentration depending upon the particular engine and type of operation in which it is employed. If the engine is operating at relatively high efficiency, average combustibles concentration in the exhaust stream will be relatively low and in such case a minimum of air should be supplied. If, on the other hand, the conditions of service produce relatively inefficient engine operation, as in the case of a bus operating constantly in heavy traffic, with resultant high average concentrations of combustibles in the exhaust stream, a substantial excess of air over that necessary to provide stoichiometric oxygen may be required to prevent overheating of the catalyst.

While any suitable means may be employed to introduce the air into the system and to control the rate of air admission in the proper manner it is preferable from the standpoint of simplicity and cost to employ an air insipirator using a venturi type construction operating on the steam ejector principle. As will be explained hereinafter, such a device although having no moving parts may be so adjusted as to automatically provide the desired average air to exhaust gas ratios and to provide the desired inverse variation of air to exhaust gas ratio with engine speed.

If desired however, other means for supplying and controlling the flow of air may be employed, such as an air blower with an appropriate throttling valve to reduce the air to exhaust gas ratios as the engine speed increases. Embodiments of the invention operating on both of these principles are illustrated in the accompanying drawings to which reference is now made.

FIG. 1 is a view of one type of catalytic exhaust purifier connected to an engine and supplied with air by means of an inspirator operating on the steam ejector principle.

FIG. 2 is a perspective view of the type of catalytic unit employed in the purifier illustrated in FIG. 1.

FIG. 3 is a cross-sectional view of one of the catalytic elements employed in the unit illustrated in FIG. 2.

FIG. 4 is an enlarged view with some parts in section of the air inspirator employed in connection with the purifier illustrated in FIG. 1.

FIG. 5 is a semi-diagrammatic view of a second type of catalytic purifier supplied with outside air by means of a blower, the delivery rate of which is controlled by a valve connected by suitable linkage to the accelerator pedal.

FIG. 6 is an enlarged view of the linkage connecting the valve for controlling the blower output to the accelerator pedal.

FIG. 7 is a semi-diagrammatic cross-sectional view of the catalytic purifier illustrated in FIG. 5.

Referring now to FIG. 1, the reference numeral 1 refers to a 4-cycle gasoline-powered piston engine of the conventional type used for automotive purposes. The exhaust gases from the engine are collected by exhaust manifold 2. A flanged pipe 3 connects the exhaust manifold to the catalytic exhaust purifier designated generally by the reference letter P.

The exhaust gases flow first through an air inspirator operating on the steam ejector principle designated generally by the reference letter I. An enlarged view of the air inspirator is shown in FIG. 4. It consists of a nozzle portion 4 which converges in the direction of gas flow, this nozzle portion having an integral flange 5. The flanged nozzle is bolted by means of bolts 6 to a flange 7 which is in turn welded to the pipe 3 leading from the exhaust manifold. A second member designated generally by the reference numeral 8 has a portion 8a converging in the direction of gas flow and another portion 8b diverging in the direction of gas flow, the two portions 8a and 8b being connected at 8c to form a throat. Member 8 is bolted by means of bolts 6 to flange 7, bolts 6 thus serving to secure both the nozzle flange 5 and the member 8 to the flange 7. The other end of member 8 is bolted to a closure plate 12 which forms the inlet end of the purifier housing.

Nozzle 4 is spaced from throat 8c. Converging portion 8a forms a chamber 9 which communicates with the atmosphere through an air inlet conduit 10 equipped with an air filter 11 which prevents road dust and the like from being carried into the purifier system.

In the operation of the inspirator, the flow of exhaust gases through the converging nozzle 4 and the throat 8c creates a reduced pressure at the throat in accordance with the well known principle of a venturi. The system must be adjusted so that the pressure at the throat is reduced below atmospheric pressure so that in this way the flow of air is induced through air inlet conduit 10 into chamber 9 from which it flows into and is mixed with the exhaust gases, such that a mixture of air and exhaust gases flow through diverging portion 8b into the purifier housing. The flow of exhaust gases and air is shown by the arrows. As will be explained in more detail hereinafter, by properly sizing the components of the inspirator in relation to the pressure drops occurring through the purifier system the desired average air to exhaust gas ratio, and the desired inverse variation of this ratio with engine speed may be obtained.

The catalytic purifier shown in FIG. 1 comprises a series of metal shell sections 13, open at both ends and having flanges 14 at each open end. The shells are interconnected by means of flanges 14 which mate with one another as shown and are fastened together by means of bolts 15.

Each of the shell sections 13 carry a catalytic unit designated generally by the reference letter U. FIG. 2 shows a perspective view of one of these catalytic units. As may be seen, each unit comprises a pair of end plates 16 which are fastened in spaced-apart relationship to either end of a stout centerpost 17. Between the end plates extend a plurality of rod-like elements 18 which are carried in apertures provided in the end plates. As may be seen in FIG. 3, which shows a cross-sectional view of the rod-like elements 18, these elements are streamlined in cross-section having a rounded leading edge 18a and a tapered trailing edge 18b. Each of the elements 18 are provided with a thin film of catalytic material 18c (FIG. 3). Catalytic units of this construction are described in United States Patent No. 2,703,434.

Each catalytic unit U provides a plurality of spaced-apart rod-like elements which are arranged in rows, with the elements in each row being arranged in staggered relationship with the elements in adjacent rows so as to provide intimate gas to catalyst surface contact. The units U are preferably constructed of ceramic material, most desirably a high quality unglazed porcelain, so as to be able to withstand the relatively high operating temperatures involved. The catalytic film is preferably of the type described in United States Patent No. 2,742,437. One very suitable type of catalytic film for example consists of a superficial film of approximately .003" in thickness of activated alumina impregnated with approximately 1% by weight (based on the weight of the alumina) of finely divided platinum.

It is to be understood that the invention is not limited to any particular type of configuration of catalyst, the above detailed examples being given by way of illustration.

The catalytic units U are mounted in the shell sections 13 with the rounded portions of the rod-like elements 18 facing in the direction of gas flow. The shell sections are formed with depressed panels 19 which prevent the by-passing of exhaust gases between the outermost rod-like elements 18 and the sides of the shell sections. The inwardly depressed panels 19 furthermore provide guides in the upper and lower portions of the shell section for slidably receiving the end plates 16 of the units U which are inserted into the shell section from either open end thereof.

The exit end of the purifier is closed by means of an end plate 20 which is bolted to the flange on the last shell section as shown. The end plate 20 carries a tail pipe 21 through which the purified exhaust gases flow to the atmosphere. For the purpose of determining the operating temperature of the purifier a thermocouple is positioned within the tail pipe 21 at 22 and is connected by a lead wire 23 to an indicating pyrometer 24 which thus continually indicates the operating temperature of the purifier by detecting the exit temperature of the exhaust gases therefrom.

In the operation of the purifier, the air-exhaust gas mixture flows through the series of shell sections 13 and over the surface of the catalytic rod-like elements 18. The combustible constituents in the mixture including carbon monoxide, hydrogen, methane, and higher hydrocarbon and oxygenated organic compounds are catalytically oxidized in the presence of inspirated air at the surface of the catalytic elements 18. The oxidation reaction being highly exothermic liberates substantial quantities of heat which serves to maintain the catalytic units at an elevated temperature.

Before catalytic reaction begins to take place to any appreciable extent the catalyst must be heated to a temperature of approximately 400° F. to 600° F. This may ordinarily be done by operating the engine at a relatively high speed and under load such that exhaust gas temperatures of this order of magnitude are obtained. The catalyst is thus heated by the sensible heat of the exhaust gases and when reaching 400° F. to 600° F. a catalytic reaction begins to take place. This further increases the temperature of the catalyst and, to obtain efficient purification, the catalyst operating temperature should be maintained within the limits of 800° F. to 1400° F. and preferably between 900° F. and 1200° F.

As explained initially, it has been found that the maintenance of these necessary catalyst temperatures and accordingly the efficiency with which the purifier eliminates the oxidizable constituents is critically dependent upon control of the manner in which air is supplied to the system.

As explained, a continual variation in the air to exhaust gas ratio in accordance with engine speed is required, with the highest air to exhaust gas ratio being provided at idling speed and with a progressively decreasing air to exhaust gas ratio as the engine speed progressively increases. Secondly, the average value of the air to exhaust gas ratio must be controlled with respect to the average concentration of combustibles in the exhaust stream which will vary depending upon the efficiency of the engine and the conditions under which it is employed. The following examples summarized in the table below illustrate the necessity for these two types of control in connection with three different types of engine operating conditions.

Example 3 shows a still less efficient type of operation characteristic of a city bus which operates over most of its running time at idling or is continually accelerating or decelerating as it travels over relatively short distances between stops. Relatively low average air-fuel ratios characterize this type of operation. It will be noted that with decreasing efficiency of operation, the percentage of combustible material in the exhaust stream progressively increases.

For each example, the conditions are shown at idling speed. In the case of the automobile or truck the conditions are also shown at normal cruising speed of 40 miles per hour while for the lift truck and city bus the conditions are also shown at governed engine speed. In each case it will be noted that at the higher speed there is a marked decrease in the percentage of combustibles in the exhaust stream. This may be seen from the exhaust gas analyses and the heat release (B.t.u./min./cu.ft) accompanying the oxidation of the combustibles It will also be seen that in each case there is a marked increase in the exhaust gas temperature at the higher speed Thus, at idling the exhaust gas is characterized by relatively high concentrations of combustibles and relatively low temperature while at higher speeds the exhaust is characterized by relatively low concentrations of combustibles and relatively high temperatures. Assuming complete oxidation of the combustible constituents under all conditions, it is accordingly apparent that most of the heat contributed to the catalyst at idling condition is in the form of chemical heat from oxidation of the combustibles while in general most of the heat supplied at higher speeds is in the form of sensible heat in the exhaust gases.

In accordance with the invention it has been found that these heat relationships require the maximum air to exhaust gas ratio at idling and a progressive decrease in this

*Table I*

|  | Automobile or over-the-road Truck | | Industrial lift truck | | City Bus | |
| --- | --- | --- | --- | --- | --- | --- |
|  | Idle | 40 m.p.h. | Idle | Gov. Spd. | Idle | Gov. Spd. |
| Engine Piston Displacement (cu. in.) | 280 | | 160 | | 500 | |
| Avg. Air/Fuel ratio by weight | 13.0:1 | 15.0:1 | 12.0:1 | 13.5:1 | 11.0:1 | 13.5:1 |
| Exhaust gas analysis: | | | | | | |
| $CO_2$, percent by vol | 10.6 | 13.4 | 9.4 | 11.5 | 8.2 | 11.5 |
| $O_2$, percent by vol | 0.8 | 1.0 | 0.6 | 0.6 | 1.0 | 0.6 |
| $CO$, percent by vol | 4.5 | 1.2 | 5.9 | 3.8 | 8.9 | 3.8 |
| $H_2$, percent by vol | 1.6 | 0.2 | 2.4 | 1.3 | 4.4 | 1.3 |
| $HC$, percent by vol | 0.08 | 0.03 | 0.15 | 0.03 | 0.5 | 0.03 |
| Exhaust flow before air addition (s.c.f.m.) | 10 | 40 | 5 | 40 | 30 | 125 |
| Air-exhaust gas weight ratio | .235 | .08 | .50 | .25 | 1.00 | .50 |
| Exhaust flow after air addition (s.c.f.m.) | 12.35 | 43 | 7.5 | 50 | 60 | 187.5 |
| Exhaust gas temperature before air addition, ° F | 230 | 775 | 265 | 795 | 330 | 1,160 |
| Percent excess air over that required to supply necessary oxygen | 29 | 60 | 82 | 85 | 85 | 270 |
| Exhaust gas temp. after air addition, ° F | 200 | 725 | 200 | 650 | 200 | 800 |
| Available heat from oxidizing combustibles, B.t.u./cu. ft | 22.1 | 5.6 | 31.6 | 17 | 60.7 | 17.0 |
| Theoretic catalyst temp. (neglecting heat loss) ° F | 1,300 | 990 | 1,200 | 1,330 | 1,700 | 1,370 |
| Approx. catalyst temperature after heat losses | 1,100 | 900 | 1,050 | 1,150 | 1,350 | 1,200 |

The above three examples illustrate three types of engine operation at three different levels of efficiency. Example 1 illustrates the operation of a 4-cycle gasoline engine as employed in an automobile or over-the-road truck under conditions in which it operates for substantial periods of time at cruising speeds, as in light city traffic or suburban traffic or country driving. Under such conditions relatively efficient operation is obtained and accordingly the average air to fuel ratios are relatively high.

Example 2 shows a less efficient type of operation characteristic of an industrial fork lift truck operating in a freight yard or warehouse where the less efficient operation is obtained and with correspondingly higher air-fuel ratios.

ratio as the engine speed progressively increases. This type of variation in the air to exhaust gas ratio is illustrated in the above three examples. In Example 1 it will be noted that this ratio decreases from 0.235 at idling to 0.08 at 40 miles per hour. In example 2 this ratio decreases from 0.5 at idling to 0.25 at governed speed, while in Example 3 this ratio decreases from 1.0 at idling to 0.5 at governed speed. When the air:exhaust gas ratio is decreased in this manner, the catalyst operating temperature will remain in about the same temperature range at the higher speeds as at idling speed.

If, however, this ratio remains constant throughout all engine speeds, that is, if the ratio set for idling is maintained at higher speeds, the catalyst temperature will drop below the level necessary for effective operation. If in Example 1 the ratio of .235 were maintained at 40 m.p.h. for example, the temperature of the air-exhaust gas mixture before catlaytic treatment would drop from 775° F. to 640° F. With the increased flow and correspondingly increased velocity over the catalyst at 40 m.p.h. (a fourfold increase over idling) this relatively low catalyst inlet temperature tends to cool the catalyst bed down rapidly, reducing the catalyst temperature below the level at which complete oxidation of the combustibles occurs. Lack of complete oxidation of the combustibles further depresses the temperature of the catalyst with the result that catalyst temperatures will tend to approximate the inlet gas temperaure. Not only would this drop in catalyst temperature render the purifier inefficient at higher speeds, but this would also seriously decrease the efficiency or render the purifier inoperative at lower engine speeds and idling speed. For example, if the catalytic mass was permitted to cool to a temperature of 650° F. on high speed operation, on change to operation at idling speed the catalyst temperature would be too low to effectively oxidize the relatively high concentration of combustibles in the stream and a large portion of these materials would pass through the purifier unchanged. While prolonged operation at idling might again result in increasing the temperature of the catalyst mass to effective levels, under practical operating conditions this will generally not occur and excessive cooling of the catalyst at high speeds will result in an undesirably low catalyst operating temperature under all conditions.

A similar situation would be encountered in Examples 2 and 3 if the air to exhaust gas ratio employed at idling speed were maintained throughout higher speeds. In Example 2, if the air to exhaust gas ratio were maintained at 0.5 at governed speed the temperature of the air-exhaust gas mixture at governed speed before catalytic treatment would be reduced from 795° F. to 555° F. and the catalyst operating temperature would drop to a temperature only slightly greater. In Example 3, if the air to exhaust gas ratio was maintained at a value of 1.0 at governed speed, the temperature of the air-exhaust gas mixture before catalytic treatment would drop from 1160° F. to 620° F., and the catalyst operating temperature would drop to a temperature only slightly higher.

The second type of control, namely control of the air supply with respect to the average concentration of combustible material in the exhaust is also illustrated by Examples 1 to 3. As may be seen, the average concentration of combustibles in the exhaust stream progressively increases in Examples 1, 2 and 3 corresponding to progressively increasing average air-fuel ratios.

In Example 1, which illustrates relatively efficient engine operation characterized by relatively high average air-fuel ratios, it may be seen that only a slight excess of air over that required to furnish the stoichiometric oxygen for oxidizing the combustible constituents in the exhaust stream is supplied. In Example 2, where the average air-fuel ratios are somewhat lower, the amount of excess air over that required to furnish stoichiometric oxygen is significantly increased in contrast to Example 1. In Example 3 illustrating relatively inefficient operation characterized by low air-fuel ratios, a considerable quantity of excess air over that required to supply stoichiometric oxygen is necessary to prevent the catalyst operating temperature from exceeding permissible levels. In all cases by proper selection of the average air to exhaust gas ratios, the catalyst operating temperature is maintained within limits of approximately 900° F. to 1350° F.

Failure to select the proper average air to exhaust gas ratios in relation to the average combustibles concentration in the exhaust gas may result in either excessively high or excessively low catalyst operating temperatures. In Example 1 for instance, if the air:exhaust gas dilution ratios used in Example 2 were employed the catalyst operating temperature would be reduced to an average level of approximately 700° F. at which efficient purification could not be obtained. Similarly, if the average ratios employed in Example 2 were used in Example 3, the average catalyst operating temperature would increase to over 2000° F. which would greatly shorten the life of the catalyst and would furthermore damage any catalyst housing that could be provided at a practical cost.

It is thus apparent that to control the catalyst temperature within the proper limits, namely between 800° F. and 1400° F. and preferably between 900° F. and 1200° F., the air to exhaust gas ratios must be controlled with respect to the average concentration of combustibles in the stream. As a practical matter, the proper choice of these ratios may be determined empirically in any given case by adjusting the ratios and observing the catalyst operating temperature. If determination of the proper ratio is made at idling speed and under high speed and load conditions proper operation may be obtained by continually varying the ratios between these two values as the engine operates over its range of speeds, as explained above.

In order to control the air supply in the manner described above using an air inspirator of the type illustrated in FIG. 4, both the dimensions of the components of the air inspirator and the pressure drops through the system following the air inspirator must be properly selected. By properly selecting these values, the desired air to exhaust gas dilution ratios and the inverse variation of these ratios responsive to the speed of the engine may be obtained without the use of any moving parts in the system. One suitable procedure for accomplishing this is to adjust the catalytic system following the inspirator so that at idling condition the total pressure drop through the system following the inspirator (that is through the catalyst bed and through the outlet from the catalyst chamber) is very small, for example less than ½″ of water. Having thus adjusted the pressure drops through the catalyst system, the shape and size of nozzle 4 (FIG. 4), the size and shape of the throat 8c, the spacing between nozzle 4 and the throat, and the size of the air inlet 10 is selected so as to provide the desired air to exhaust gas ratio at idling speed. In general, the greater the constriction in nozzle 4 and throat 8c the higher will be the air to exhaust gas ratio. This follows from the well known principle of the venturi that the change in pressure at the venturi throat is roughly proportional to the change in velocity of the fluid stream flowing through the constriction, the change in velocity of course being proportional to the degree of constriction. The greater reduction in pressure $P_t$ at the throat 8c of the air inspirator the greater will be the driving force for the inspiration of air. Thus a decreasing value for $P_t$ with increasing constriction in the nozzle and throat 8c results in greater values for the air to exhaust gas ratio.

This ratio may be further controlled by sizing of the air inlet 10 and the distance between the nozzle 4 and the throat 8c. Within limits, increasing the size of the air inlet and the spacing between nozzle 4 and throat 8c will result in increase in air to exhaust gas ratios.

Having thus attained the desired air to exhaust gas ratio at idling, the catalytic system following the air inspirator should be so adjusted that the pressure drop increases rapidly with increasing engine speed. Control over the pressure drop may be obtained in the system illustrated in FIG. 1 conveniently by adjusting the size of the outlet from the catalyst chamber, namely the size of the tail pipe 21. As the size of the tail pipe is decreased, the rate of increase in pressure drop through the system increases more rapidly with increasing flow of exhaust gases corresponding to higher engine speeds.

A rapidly increasing pressure drop through the catalyst system following the inspirator with increasing speed increases the pressure $P_t$ at the throat of the inspirator thus reducing the driving force (the difference between atmospheric pressure and $P_t$) which produces air inspiration.

Thus, the rapidly increasing pressure drop through the catalytic system results in a progressive reduction in the air to exhaust gas ratios with increasing speed.

The following specific example illustrates a system including an air inspirator and a catalytic purifier of the type illustrated in FIGS. 1 to 4 of the drawings in which the inspirator and the catalytic system is properly adjusted to provide the required control and continual variation of the air supply. The purifier was installed on a Continental Model F-124 gasoline-powered engine of the spark fired 4-cycle type having four cylinders, a 3" bore x 4⅜" stroke. This engine has a 124 cu. in. piston displacement, and a compression ratio of 6.3:1. It develops 36.5 H.P. at 2400 r.p.m. Exhaust flow at idling is 5 s.c.f.m. and at governed speed (2150 r.p.m.) is 40 s.c.f.m.

The exhaust manifold of this engine was connected by a pipe (1½" I.D.) to an air inspirator of the type shown in FIG. 4. The nozzle 4 of the inspirator tapered from a maximum I.D. of 1.125" to a minimum diameter of .75" over its length of .925". The exit end of the nozzle is spaced .375" from the throat 8c which has an I.D. of .970". The diverging portion 8b has a length of 1.2" and an outlet I.D. of 1.125". The area of the annular space between the exit end of the nozzle 4 and the converging portion 8a is .6 sq. in. The I.D. of the air inlet tube 10 is ⅞".

The catalyst system consisted of four shell sections as shown in FIG. 1 containing four catalytic units U. Each catalytic unit except the first contains 71 rod-like elements 18 (6" long) supported between end plates 16 (3" x 3"). The first unit contains 47 of the elements 18. The rod-like elements 18 were streamlined in cross-section as shown having a maximum thickness of 0.119" transverse to the direction of gas flow and a width of 0.241" from leading edge to trailing edge. The elements 18 are arranged in each unit in 8 rows with a center-to-center spacing between each element in each row of 0.141" and a center-to-center spacing between rows of 0.341". Elements in adjacent rows are arranged in staggered relationship to one another. The diameter of the tail pipe 21 is 2".

With the catalytic system described above the pressure drop through the system from a point immediately after the air inspirator to the exit end of the tail pipe is less than ½" of water at idling speed and about 7" of water at governed speed. The pressure drop varies between these two limits at intermediate speeds of the engine.

With this arrangement the air to exhaust gas ratio at idling is approximately 0.5 while at governed speed this ratio decreases to 0.2. As the engine operates over its full range of speeds between these two limits the air to exhaust gas ratio automatically and continually decreases with progressively increasing speed and vice versa. With the engine operating under conditions such that average air-fuel ratios vary between 12.0:1 at idling to 13.5:1 at governed speed the catalyst system will be maintained within the limits of approximately 1000° F. to 1200° F. over all conditions of operation.

As will be apparent from the above discussion, the adjustment of the air-exhaust ratios in any particular case will depend upon the type of engine and the conditions under which it is operating, particularly with respect to the average air-fuel ratios employed in the engine. Generally speaking, the proper air to exhaust gas ratios by weight for any particular engine operating under any specific set of conditions will be found to lie within the range of from about 0.2:1 to 2:1 by weight at the idling condition of the engine and from about 0.05:1 to 1.5:1 by weight at the normal top speed of the engine. In the specification and in the claims, all air to exhaust gas ratios are given in terms of ratios by weight.

Reference is now made to FIGS. 5 to 7 which illustrate another embodiment of the invention in which the air is supplied to the exhaust gas stream by means of a constant speed blower, the variation of the air to exhaust gas ratio with engine speed being controlled by means of a valve operated through a linkage from the accelerator pedal. The reference numeral 30 refers to a conventional spark-fired 4-cycle gasoline engine having a generator 31 driven by a pulley 32 mounted on the engine crankshaft and connected to the generator by means of pulley 33.

Exhaust gases are collected by the engine manifold 34 which is in turn connected to a pipe 35 which conducts the exhaust gases to a catalytic exhaust purifier designated generally by the reference numeral 36. A tail pipe 35a conducts the purified exhaust gases from the purifier to the atmosphere.

A centrifugal blower 37 is driven by a constant speed electric motor 38. Motor 38 is supplied with electric current from generator 31 by means of lead wire 39 which is connected to one terminal of the motor through the ignition switch 40 and lead wire 41. The generator 31 is grounded to the frame at 42 while the motor is grounded to the frame at 43. The air delivered by blower 37 is conducted by means of pipe 44 into pipe 35 where it is mixed with the exhaust gases. A valve having a rotatable vane 45 is provided in pipe 44, this valve being controlled by the accelerator pedal 46 through a linkage which is illustrated in an enlarged view in FIG. 6.

Referring to FIG. 6 it may be seen that accelerator pedal 46 is mounted on the floor board 47 of the driver's compartment and is pivoted at 48. The accelerator pedal is connected to the valve vane 45 by a linkage comprising a series of rods 49, 50, 51 and 52. Rod 49 is pivotably connected at one end to accelerator pedal 46 at 49a and at its other end to rod 50 and 49b. Rod 50 is pivotably fastened on a fixed bracket 53 at 50a, bracket 53 being rigidly fastened to a portion of the automobile frame by any convenient means. Rod 50 is also pivotably connected to rod 51 at 50b. Rods 51 and 52 are pivotably connected at 51a while rod 52 is rigidly fastened to one end of the shaft 45a on which the vane 45 is mounted for rotation therewith.

The catalytic purifier 36 employed in FIG. 5 is shown semi-diagrammatically in FIG. 7. Referring to FIG. 7, it may be seen that the purifier consists of a housing 60 provided with a layer of insulation 61 which is in turn covered by a light gage metal jacket 62. At the inlet side of the purifier a member 63 is provided to which the conduit 35 is attached, member 63 providing an inlet chamber 63a. At the outlet side of the purifier a member 64 is provided to which is connected the tail pipe section 35a, member 64 providing an outlet chamber 64a. Partition members 67 and 68 provide support for a pair of foraminous sheets 65 and 66, members 65 and 66 being further supported by U-shaped members 69 and 70. The foraminous sheets 65 and 66 define a space between them for catalyst pellets 71 which provide a bed of a suitable oxidation catalyst. A suitable catalyst may comprise for example pellets of activated alumina, ⅟₂₀" in size and impregnated with suitable metals having oxidation activity such as platinum, palladium, silver, copper, and the like.

The exhaust gases flow as shown by the arrows into the purifier from pipe 35, into the inlet chamber 63a, the upper chamber A, through the bed of catalyst pellets, into the lower chamber B, thence to the outlet chamber 64a and the purified gases are finally exhausted to the atmosphere through tail pipe 35a.

In the operation of the embodiment shown in FIGS. 5 to 7, the centrifugal blower 37, operated by constant speed electric motor 38, delivers the necessary air into the exhaust gas stream. As is well known, the output of a constant speed centrifugal blower will depend upon the static head against which it delivers. The static head in pipe 35 into which the centrifugal blower 37 delivers increases with increasing engine speed. Accordingly, the amount of air delivered by blower 37 into pipe 35 with increasing engine speed will tend to decrease. While it is necessary, as explained above, to decrease the weight ratio of air to exhaust gases with increasing engine speeds, because of the increased flow of exhaust gases at the higher speeds, the actual amount of air necessary at higher speeds is somewhat greater than that required at idle. This is illustrated in the table above summarizing Examples 1 to 3. In Example 1, for instance, the amount of air required at idle is 2.35 s.c.f.m. while the amount of air required at 40 m.p.h. is 3 s.c.f.m.

In order therefore to increase the amount of air delivered at higher speeds (although at the same time decreasing the ratio of air to exhaust gases with increasing engine speed) it is necessary to throttle the delivery of air to the pipe 35 at idling speed and to release this throttling action progressively as the engine speed increases to permit larger amounts of air to be delivered from the constant speed centrifugal blower 37.

This is accomplished by operatively connecting the valve vane 45 to the accelerator pedal as illustrated in FIG. 6. When the accelerator pedal 46 is undepressed as shown in the drawing at which time the engine will be at closed throttle or idling condition, the valve vane 45 is in the position shown in solid lines in which the flow of air from blower 37 to pipe 35 is throttled. The position of valve vane 45 at idling should be so adjusted that the proper amount of air is delivered at idling. Preferably, an auxiliary control over the delivery rate of blower 37 is provided such as a movable plate 54 movably pivoted at 55 which can be adjusted to close off any desired portion of the intake opening 53 of the blower.

After the valve vane 45 has been adjusted to provide the proper amount of air at idling condition, the proper amount of air delivery at higher speeds is provided by the linkage illustrated. When the accelerator pedal is depressed to accelerate the engine, rod 50 is rotated in a clockwise direction as indicated causing pivot point 51a to rotate in a counter-clockwise direction, in turn causing the valve vane 45 to rotate in a counter-clockwise direction as indicated and thus move to a more fully opened position as indicated by the dotted lines in FIG. 6. This compensates for the higher static heads in pipe 35 at higher engine speeds, and thus permits a somewhat increased flow of air.

The adjustment of the device shown in FIG. 6 will of course be made empirically, depending upon the particular engine conditions. For instance in Example 1 shown in the table above, the valve vane 45 would be set at the idling condition of the engine so as to deliver 2.35 s.c.f.m. of air, while at 40 m.p.h. the vane would be set so as to permit the blower 37 to deliver a flow of 3 s.c.f.m., thus obtaining the proper air to exhaust gas ratios at these conditions.

It is to be understood that other modifications of the invention other than those specifically described above are intended to be included within the scope of the appended claims.

This application is a continuation-in-part of prior copending application Serial No. 167,856, filed June 13, 1950, now Patent No. 2,811,425, issued October 29, 1957, and is a continuing application of co-pending application Serial No. 649,848, filed April 1, 1957, now abandoned.

What is claimed is:

1. In a combination of a catalytic exhaust purifier with a gasoline-powered internal combustion engine adapted to operate over a range of speeds including idling speed and a higher speed, a purifier including a housing containing oxidation catalyst, a conduit connecting the exhaust outlet from said engine with the exhaust purifier so that the exhaust gases pass over said oxidation catalyst, an air impeller to deliver air to said conduit between the engine and the purifier, means to control said air delivery to maintain said oxidation catalyst within the operating temperature range thereof and such that the amount of air admitted at idling speed of the engine when the flow of exhaust gases is at a minimum provides a maximum weight ratio of air to exhaust gases flowing to said purifier while the amount of air admitted at a higher speed of the engine is such that the weight ratio of air to exhaust gases flowing to the purifier is decreased.

2. The combination of a catalytic exhaust purifier with a gasoline-powered internal combustion engine adapted to operate over a range of speeds including idling speed and a higher speed comprising an exhaust purifier including a bed of oxidation catalyst pellets, a conduit connecting the exhaust outlet of said engine with the purifier so that the exhaust gases pass through said oxidation catalyst bed, a pipe connected to said conduit intermediate the engine and purifier for admitting air into said conduit, and means to regulate said rate of air admission so as to maintain the temperature of said oxidation catalyst bed within its operating temperature range including valve means partially throttling said pipe at idling speed, a substantially constant speed impeller connected to said pipe for delivering through the throttled pipe at idling speed a maximum weight ratio of air to exhaust gases, and control means to open said valve when the engine is operating at a higher speed to provide for the delivery through said pipe of an increased amount of air and yet maintain a decreased weight ratio of air to exhaust gases.

3. The combination of a catalytic exhaust purifier with a gasoline-powered internal combustion engine adapted to operate over a range of speeds including idling speed and a higher speed comprising a purifier including a bed of oxidation catalyst pellets, a conduit connecting the exhaust outlet of said engine with the purifier so that the exhaust gases pass through said oxidation catalyst bed, a pipe connected to said conduit intermediate the engine and purifier for admitting air into said conduit, valve means partially throttling said pipe at idling speed, a substantially constant speed impeller connected to said pipe for delivering through the throttled pipe at idling speed a maximum weight ratio of air to exhaust gases, control means to gradually open said valve as the engine speed progressively increases to provide for the delivery through said pipe of an increased amount of air and yet to provide a progressively decreasing weight ratio of air to exhaust gases, said weight ratios of air to exhaust gases being such that the oxidation catalyst is maintained within a temperature range of 800° F. to 1400° F.

4. In a combination of a catalytic exhaust purifier with a gasoline-powered internal combustion engine adapted to operate over a range of speeds including idling speed, maximum speed and speeds intermediate the idling and maximum speeds, a conduit connecting the exhaust outlet from said engine with a housing containing oxidation catalyst over which said exhaust gases flow, means for admitting air into said exhaust gases before said gases flow over said catalyst for maintaining said oxidation catalyst within the operating temperature range thereof, said air admission means comprising an air impeller connected to said conduit for delivering a stream of air into said conduit, and means for controlling the delivery of air from said impeller to said conduit such that the amount of air admitted at idling speed of the engine when the flow of exhaust gases is at a minimum provides the maximum weight ratio of air to exhaust gases flowing over said catalyst while the amount of air admitted at higher speeds of the engine is such that as the engine speed progressively increases the weight ratio of air to exhaust gases in the mixture flowing over said catalyst progressively decreases whereby the oxidation catalyst operating temperature range is maintained.

(References on following page)

References Cited in the file of this patent

UNITED STATES PATENTS

| | | |
|---|---|---|
| 1,793,813 | MacKinnon | Feb. 24, 1931 |
| 1,933,997 | Pasternack | Nov. 7, 1933 |
| 2,263,318 | Tifft | Nov. 18, 1941 |
| 2,795,103 | Jenison | June 11, 1957 |
| 2,811,425 | Houdry | Oct. 29, 1957 |
| 2,853,367 | Karol et al. | Sept. 23, 1958 |
| 2,880,079 | Cornelius | Mar. 31, 1959 |
| 2,953,898 | Cornelius | Sept. 27, 1960 |